US006666023B2

(12) United States Patent
Nagura et al.

(10) Patent No.: US 6,666,023 B2
(45) Date of Patent: Dec. 23, 2003

(54) FLUID PRESSURE TRANSMITTING APPARATUS

(75) Inventors: Shinobu Nagura, Oyama (JP); Toshio Ozawa, Oyama (JP); Norihide Mizoguchi, Oyama (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 10/013,694

(22) Filed: Dec. 13, 2001

(65) Prior Publication Data

US 2002/0073700 A1 Jun. 20, 2002

(30) Foreign Application Priority Data

Dec. 20, 2000 (JP) ....................................... 2000-386303

(51) Int. Cl.[7] ................................................ F16D 31/02

(52) U.S. Cl. .............................. 60/444; 60/443; 60/427

(58) Field of Search .......................... 60/444, 443, 427, 60/422; 180/6.2, 6.3

(56) References Cited

U.S. PATENT DOCUMENTS

| | | | | |
|---|---|---|---|---|
| 3,788,773 A | * | 1/1974 | Van der Kolk | 60/444 |
| 4,458,485 A | * | 7/1984 | Seelmann | 60/444 |
| 6,374,605 B1 | * | 4/2002 | Dvorak et al. | 60/444 |

* cited by examiner

*Primary Examiner*—Edward K. Look
*Assistant Examiner*—Michael Leslie
(74) *Attorney, Agent, or Firm*—Varndell & Varndell, PLLC

(57) ABSTRACT

A fluid-pressure transmitting apparatus that is capable of securing the operationality of a working machine and braking and preventing against engine stall. The apparatus can switch between a working-machine operating device and a traveling operating device. When a second operating unit is operated during operation of a first operating unit, the pilot pressurized oil outputted from each operating means through first and second pilot-pressure admission passages is admitted to a low-pressure selecting valve. At this time, the pilot pressurized oil is automatically selected through the low-pressure selecting valve to control the delivery capacity of the traveling pump and braking and preventing engine stall and realizing travel at low speed.

6 Claims, 6 Drawing Sheets

FLUID PRESSURE TRANSMITTING APPARATUS

BACKGROUND OF THE INVENTION

1. Technical Field of the Invention

The present invention relates to a fluid-pressure transmitting apparatus for working vehicles such as wheel loaders and bulldozers and, more particularly, to a fluid-pressure transmitting apparatus having a pilot hydraulic circuit for a capacity control device of a traveling pump.

2. Description of the Related Arts

Conventionally, the working vehicle in various kinds, including wheel loaders and bulldozers, has a pump to be driven by a drive-source engine and a pilot operation valve for varying the delivery capacity from a traveling pump or selectively supplying the delivery flow rate of a working pump to various actuators such as cylinders. The delivery capacity of pump varies depending upon an operation amount of a pilot operating lever. In the case that the pump is desirably controlled for reducing the pump delivery capacity for the purpose of engine-stall prevention or vehicle brake rather than the pump delivery capacity as determined by the control amount of the pilot operating lever, reduced is the pressure of the pressurized-oil to be supplied to the pilot operation valve of the pilot operating lever.

FIG. 5 shows one example of a hydraulic circuit of a related-art fluid-pressure transmitting apparatus having a brake pedal. In the figure, a fluid-pressure transmitting apparatus 1 has a fixed-capacity working-machine pump 2 to be driven by a not shown engine, a fixed-capacity pilot pump 3 and variable-capacity traveling pumps 4 in the left and right. The traveling pump 4 has a pump-capacity control device 5. The pump-capacity control device 5 varies the delivery capacity of the traveling pump 4 by a pilot oil pressure dependent upon an operation amount of the pilot operating lever 6*a* of the traveling operating device 6. The working-machine pump 2 is connected to various actuators such as arm cylinders and bucket cylinders, not shown, through operation valves 15, 16. The traveling pumps 4 are connected to a not-shown traveling motor.

The pilot pump 3, a hydraulic source for supplying pressurized oil to the traveling pilot hydraulic circuit and the working-machine pilot hydraulic circuit, has a delivery passage 3*a* branched with an oil passage 3*b,* 3*d* connected to the traveling operating device 6 and an oil passage 3*c* connected to the working-machine operating device 7. The pressurized oil outputted from the pilot pump 3 is supplied at nearly a constant pressure by the relief valve 8 to the branched two oil passages 3*d,* 3*b* and to the oil passage 3*c*. A fixed restriction 9 is inserted on the traveling oil passage 3*d* while a switching valve 10 is connected downstream the fixed restriction 9, to close the passage of from the oil passage 3*d* to the oil passage 3*b* and communicate the oil passage 3*b* with a tank 11 depending upon a depression amount of a pedal 10*a*.

The switching valve 10 outputs a pressurized oil depending upon a depression amount of the pedal 10*a*. In the supply position A of the switching valve 10 shown in FIG. 5, the switching valve 10 is in a full open state to directly output the pressurized oil from the pilot pump 3. When depressing the pedal 10*a* down, the switching valve 10 switches over to a close position B opposite to the supply position A. In the close position B, the oil passage 3*b* connected to the traveling operating device 6 communicates with the oil tank 11 to return the pressurized oil of the oil passage 3*b* to the oil tank 11.

The traveling and working-machine operating devices 6, 7 each has a pilot operating lever 6*a,* 7*a* shown in FIG. 6 and pilot operating valves 6*b*–6*e,* 7*b*–7*e* shown in FIG. 5. Each pilot operating valves 6*b*–6*e,* 7*b*–7*e,* as pressure-reducing valves, output a pilot pressure depending upon an inclination amount (operating amount) of the operating lever 6*a*, 7*a*.

As shown in FIG. 5, the output pressure of the traveling pilot operating valve 6*b,* 6*c* is selectively outputted to a forward or backward pilot pressure-receiving part in the pump capacity control device 5 of the traveling pump 4 through a pilot-pressure admission passage 13*a* or 13*b* connected to the bridge circuit 12, by forwardly or backwardly operating the pilot operating lever 6*a*.

The working-machine pilot operating valves 7*b*–7*e* are respectively connected, for example, to an arm valve 15 and a bucket valve 16 through pilot-pressure admission passages 14*a*–14*d*. The output pressure of the arm pilot operating valve 7*b,* 7*c* is selectively outputted to a pilot pressure-receiving part of the arm valve 15 through the pilot-pressure admission passage 14*a,* 14*b* by operating the pilot operating lever 7*a* in either upper or lower direction. The output pressure of the bucket pilot operating valve 7*d,* 7*e* is selectively outputted to a pilot pressure-receiving part of the bucket valve 16 through the pilot-pressure admission passage 14*c,* 14*d* by operating the pilot operating lever 7*a* in either direction toward digging or dumping.

When the traveling operating lever 6*a* is operated in a desired direction, e.g. when the operating lever 6*a* is inclined toward the forward shown in FIG. 6, outputted is a pressure through the corresponding pilot operating valve 6*b* depending upon an inclination amount of the pilot operating lever 6*a*. At this time, the output pressure of the other pilot operating valves 6*c*–6*e* remains a pressure in the tank 11. In the case that the pump capacity of the traveling pump 4 is desirably reduced lower than a pump capacity as determined by a current operation amount of the pilot operating lever 6*a* for the purpose of brake or engine-stall prevention, the pedal 10*a* is depressed down.

When depressing the pedal 10*a,* the switching valve 10 is switched from the supply position A toward the close position B. Because the delivery pressurized oil of the pilot pump 3 supplied to the pilot operating valve 6*b* is reduced in pressure to decrease the pressure of the pressurized oil outputted from the pilot operating valve 6*b,* the pump capacity of the traveling pump 4 can be decreased lower than a pump capacity as determined by an operation amount of the pilot operating lever 6*a*. This makes it possible to reduce the speed of the vehicle lower than a speed as determined by an operation amount of the pilot operating lever 6*a* or stop the same.

Meanwhile, there are disclosed examples of hydraulic circuits for varying the pump delivery capacity depending upon an engine rotational speed, e.g. in Japanese Patent Laid-Open Nos. 71353/1974 and 122363/1998. In the former, the pump capacity is increased with the increase in engine speed, wherein, at low rotational speed of the engine, the pilot oil pressure is cut off to decrease the pump capacity. In the latter, when the engine rotational speed increases exceeding a predetermined level, the pressure of a pilot oil-pressure source is decreased to reduce the capacity of a variable capacity pump.

In the related-art fluid-pressure transmitting apparatus exemplified in FIG. 5, in the traveling pilot hydraulic circuit the switching valve operated by the pedal is arranged on the output side of the pilot pump so that the delivery pressurized oil of the pilot pump is supplied to the traveling operating device having the pilot operating lever through the switching valve. The switching valve is usually in a communication state, and reduced in opening degree depending on a depression amount thereof to gradually decrease its output to the traveling pilot hydraulic circuit.

In the meanwhile, the arrangement of the working-machine pilot operating lever and traveling operating lever is different in various forms depending on its vehicle kind and manufacturer. For this reason, in order to secure the common operationality to the operating levers for various working vehicles, there has been an attempt to switch such that, for example, the working-machine pilot operating lever at its output is connected to the capacity control device of the traveling device and that the traveling pilot operating lever at its output is connected to the operation valve of a working-machine actuator, thereby modifying the operation pattern in the plot operating lever, for example, to allow an operator accustomed for other manufacturer s vehicle to drive his company-make vehicle in the same operating pattern.

In the related-art fluid-pressure transmitting apparatus of FIG. 5, there is the switching valve to reduce the pressure of the pressurized oil from the pilot pump between the input side of the traveling pilot operating lever and the pilot pump, but the input of the working-machine pilot operating lever connects directly to the output of the pilot pump. Also, the traveling pilot operating lever at its output is connected to the capacity control device of the traveling pump while the work equipment pilot operating lever at its output is connected to the work equipment operating valve.

Namely, the pilot hydraulic circuits on the traveling and work equipment sides constitute independent, different circuits from each other. For this reason, it is not satisfactory to merely switch, for connection, the piping on the output side of the working-machine pilot operating lever and the piping on the output side of the traveling pilot operating lever. There is a need to simultaneously switch the connection over between the piping for supplying pressurizing oil to the work equipment pilot operating lever and the piping for pressurized oil supply to the traveling pilot operating lever.

In order to realize such connection, the arrangement of piping must be modified on the input and output sides of the work equipment and traveling pilot operating levers, or otherwise a two-stage switching valve or the like be provided to simultaneously switch the connections on the pressurized-oil supply side and output side of the pilot operating levers. This however requisitely requires not only to increase the number of parts and extend the setup space but also to inevitably complicate and size-increase the hydraulic circuits, resulting in large increase of the parts and manufacture cost hence being improper in practical application.

Accordingly, in the related-art fluid-pressure transmitting apparatus, where changing the operation pattern of the pilot operating lever, it is not easy to switch, as in the above manner, the connection over between the both pressurized-oil passages to the traveling and work equipment pilot operating levers.

Meanwhile, in the related-art fluid-pressure transmitting apparatus shown in FIG. 5, where a pressure-reducing unit for automatically changing the output pressure depending on an engine rotational speed as disclosed, e.g. in Japanese Patent Laid-Open Nos. 71353/1974 or 122363/1998 is inserted in place of the pedal-operated switching valve on the traveling pilot hydraulic circuit, if the engine speed is lowered to reduce the pressure of the pump delivery pressurized oil to be supplied to the working-machine operating device depending on the engine rotational speed, when the operating machine actuator requires a large flow amount of pressurized oil, the pressure particularly in a low engine rotational speed region is also reduced, for example, of the pilot pressurized oil outputted to an arm pilot operating valve of the arm operating device through the working-machine pilot hydraulic circuit.

Consequently, even if the pilot operating lever of the arm operating device is maximally tilt-operated, the pilot pressure outputted from the arm pilot operating valve is insufficient with a result that there occurs a case that the pressurized oil required for the working-machine actuator cannot be sufficiently supplied.

SUMMARY OF THE INVENTION

The present invention has been made in order to eliminate the above problem in the related art, and it is a concrete object thereof to provide a fluid-pressure transmitting apparatus capable of securing the operationality of a work equipment and preventing against braking and engine stall.

Furthermore, another object is to provide a fluid-pressure transmitting apparatus which makes it possible to switch over, in arrangement relationship, between the operating device for a work equipment and the operating device for traveling.

According to the present invention, a fluid-pressure transmitting apparatus having a pilot hydraulic circuit for a pump capacity control device, the fluid-pressure transmitting apparatus comprises: a pilot hydraulic circuit for driving the pump capacity control device comprising: a first operating unit connected at an input side to a first oil passage connected to a delivery passage of a pilot pump, to reduce a pressure depending on an operating amount thereof and output it to a first pilot-pressure admission passage of the pump capacity control device; a second operating unit connected at an input side to a second oil passage connected to a delivery passage of a pilot pump, to reduce a pressure depending on an operating amount thereof and output it to a second pilot-pressure admission passage of the pump capacity control device; and a low-pressure selecting valve connected at an input side to the first and second pilot-pressure admission passages, to select a lower pressure of through the first pilot-pressure admission passage and the second pilot-pressure admission passage and output the lower pressure oil to the pump capacity control device.

This invention reduces the oil pressure to be inputted to the second pilot-pressure admission passage according to an operating amount of the second operating unit, thereby reducing the capacity of the traveling pump lower than a capacity as determined by the operating amount of the first operating unit for the purpose of braking, engine stall prevention or the like.

In the fluid-pressure transmitting apparatus of this invention, the pilot hydraulic circuits for the traveling-pump capacity control device and work equipment actuator driving use pilot pumps as hydraulic sources. The pilot hydraulic circuit connected to the traveling-pump capacity control device has the first operating unit directly connected at an input side to the first oil passage branched from the delivery passage of the pilot pump, so that the delivery pressure of the pilot pump is inputted to the first operating unit to operate the first operating unit thereby being outputted as a pilot pressure to the traveling first pilot-pressure admission passage. On the other hand, the second operating unit at an input side is connected to the second oil passage connected to the delivery passage of the pilot pump so that by operating the second operating unit a pilot pressure is outputted, independently of the output from the first operating unit, to the traveling second pilot-pressure admission passage.

The pilot pressurized oils respectively outputted from the first operating unit and the second operating unit are admitted to the low-pressure selecting valve. When the pilot pressurized oil outputted from the first operating unit and second operating unit is inputted to the low-pressure selecting valve, the lower one of pilot pressurized oil is selected. The selected, lower pilot pressurized oil is admitted to the pump capacity control device of the traveling pump.

In this manner, the lower one of the pilot pressurized oils through the first and second pilot-pressure passages constituting a part of the traveling pilot hydraulic circuit is automatically selected through the low-pressure selecting valve. The low-pressure oil is admitted as a pilot pressurized oil to the capacity control device of the traveling pump. Accordingly, by operating the second operating unit, the capacity can be reduced lower than a capacity of the traveling pump as determined by the operating amount of the first operating unit at that time. As a result, the vehicle is allowed to travel at low speed or halt with greater stability than at a vehicular speed as determined by the operating amount of the first operating unit, making possible to obtain a proper brake performance or effectively realize the prevention against engine stall.

In the working vehicle of the invention, during usual travel or operation, unless the second operating unit is operated, the oil pressure outputted from the first operating unit is set lower than the oil pressure outputted from the second operating unit regardless of the first operating amount.

For example, when load is burdened on the engine, engine rotational speed decreases. However, if such decrease is abrupt, the operation of the first operating unit cannot reduce the capacity of the traveling pump to a capacity as commensurate with the engine rotational speed, thus making readily cause engine stall. Herein, if the pilot oil pressure to be inputted to the capacity control device is decrease d by the second operating unit to supply an oil pressure lower than that through the first pilot-pressure passage to the second pilot-pressure passage, the lower pilot pressurized oil is automatically selected and switched by the low-pressure selecting valve thereby preventing against engine stall.

Namely, in the state for example the first operating unit is held in a desired operating position, the second operating unit can properly control the traveling pump capacity at a capacity lower than that as determined by the operating amount of the first operating unit.

In the invention, it is preferred that an operating unit for a working machine is connected to the delivery passage of said pilot pump and, at an output side thereof, connected to said operating valve of said actuator through a driving pilot-pressure admission passage of said actuator. And an operating pattern switching valve is provided between a pilot-pressure output port of said first unit and a first pilot-pressure input port of said low-pressure selecting valve and between a pilot-pressure output port of said operating unit for actuator and a pilot-pressure input port of said operating valve for actuator, and said operating pattern switching valve communicates between the pilot-pressure output port of said first unit and the pilot-pressure input port of said operating valve for actuator.

The fluid-pressure transmitting apparatus of the invention directly connects the respective inputs of the work equipment operating unit and the first and second operating units to the pilot pump, and makes the outputs of the operating units independent to directly output the pilot pressurized oil from the work equipment operating unit to the operating valve of the work equipment actuator, thereby outputting the pilot pressurized oil from the first and second operating units through the low-pressure selecting valve to the capacity control device of the traveling pump.

According to this invention, the traveling first operating unit and the working-machine operating unit are admitted by the same pressure of pressurized oil from the same hydraulic source. The pressurized oil passed the first operating unit is admitted to one input port of the low-pressure selecting valve while the pressurized oil through the traveling second operating unit is admitted to the other input port of the low-pressure selecting valve. Consequently, in the invention, there is no need to change the arrangement of piping on the input side of the working-machine and traveling operating units (on a pressurized-oil supply side) as required in the conventional or of a two-stage switching valve for simultaneously switching the connections at the input and output of each operating unit. Without the necessity of switching the second pilot-pressure admission passage from the second operating unit, it is satisfactory to merely switch the pilot-pressure admission passages from the working-machine operating unit and traveling first operating unit in the above manner. Thus, the operating pattern switching valve can be simplified in structure, and moreover switching is easy.

Also, in the invention, it is preferred that the second operating unit is a switching valve with pedal to gradually reduce an output pressure depending on a depression amount.

In this invention, usually the switching valve with pedal is in an open state. Herein, when the pedal is depressed, the switching valve switches from a supply position toward a close position. Depending on a depression amount of the pedal, gradually decreased is the pressure of the pilot pressurized oil to be outputted from the pilot pump to the traveling second pilot-pressure admission passage. For example, even in a state the first operating unit is held, the operation of the pedal in a desired depressing position can control to reduce the capacity of the traveling pump lower than a capacity commensurate with the operation amount of the first operating unit.

Furthermore, in the invention, as a preferred form of the second operating unit, it is possible to employ a pressure-reducing valve for automatically changing an output pressure depending on an engine rotational speed, in place of the switching valve with pedal.

The output pressure of the pressure-reducing valve decreases with decrease in engine rotational speed. When the engine rotational speed decreases, reduced is the output pressure supplied from the pressure-reducing valve to the low-pressure selecting valve through the traveling second pilot-pressure admission passage. From the pressure-reducing valve, the pressurized oil at low pressure set due to the engine rotational speed is supplied to the low-pressure selecting valve. Simultaneously, if the first operating unit is operated to admit pressurized oil to the low-pressure selecting valve through the first pilot-pressure admission passage, the lower one of the pressurized oils through the first and second pilot-pressure admission passages is selected depending on an operation amount of the first operating unit. With that pressure, the capacity control device of the traveling pump is operated.

In the state that the first operating unit is fully operated and the traveling pump is in a great capacity, if a load is imposed on the engine, the engine rotational speed decreases and the output pressure of the second operating unit decreases. When the output pressure of the second operating unit becomes lower than the output pressure of the first operating unit, the pump capacity is set commensurate with the engine output thereby making possible to prevent engine stall.

Accordingly, in the traveling pilot hydraulic circuit, the lower one of the pressurized oils through the first and second pilot-pressure admission passages is always selected. Because the working-machine hydraulic circuit on one side can obtain a desired oil pressure independently of the traveling hydraulic circuit, favorable operationality is obtained even if engine rotation is varied.

DETAILED DESCRIPTION OF THE INVENTION

Now, preferred embodiments of the invention will be explained in detail with reference to the drawings.

Figure 5:
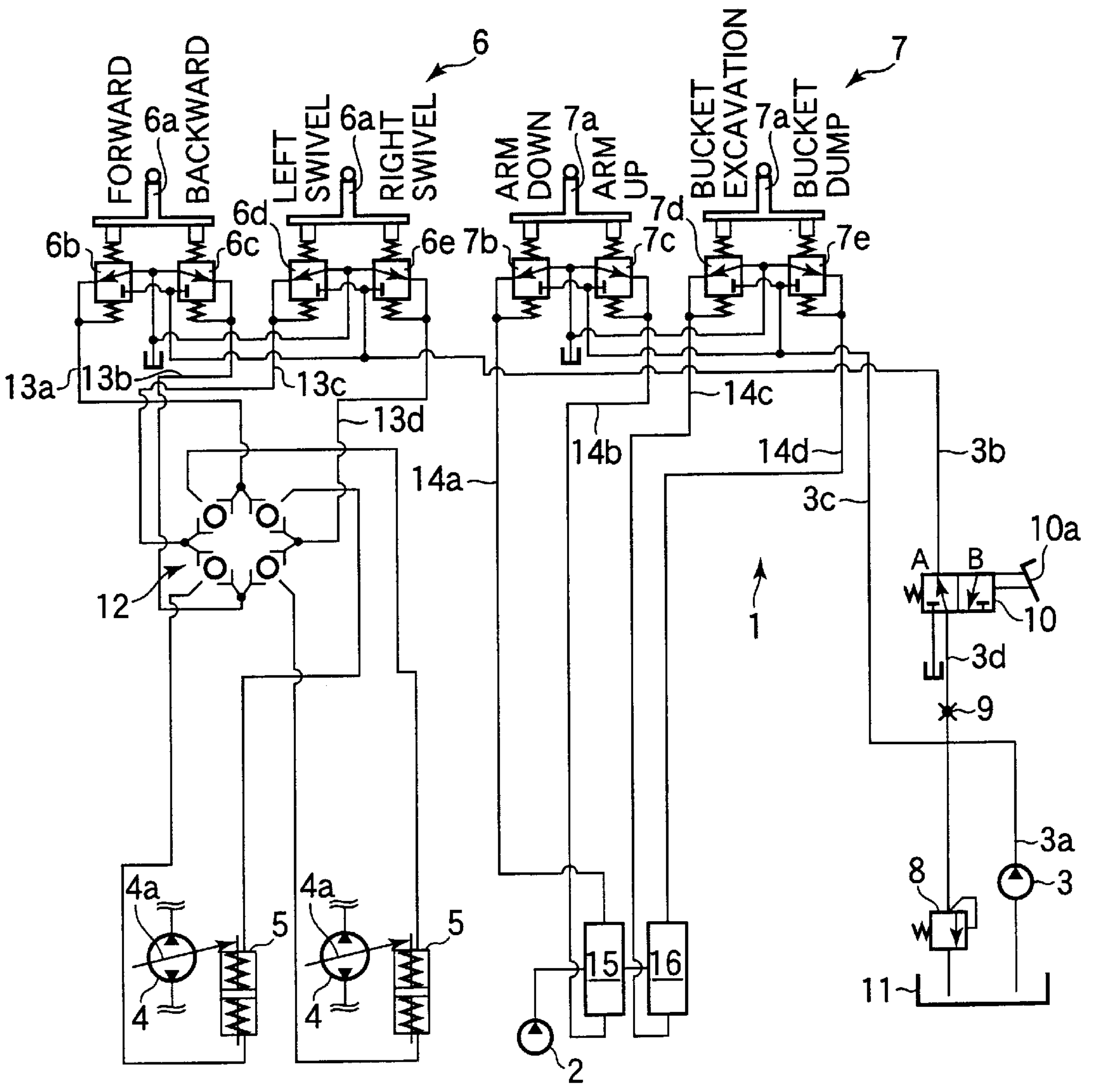
FIG. 5 is a hydraulic circuit diagram of a related art fluid-pressure transmitting apparatus.
Figure 6A:
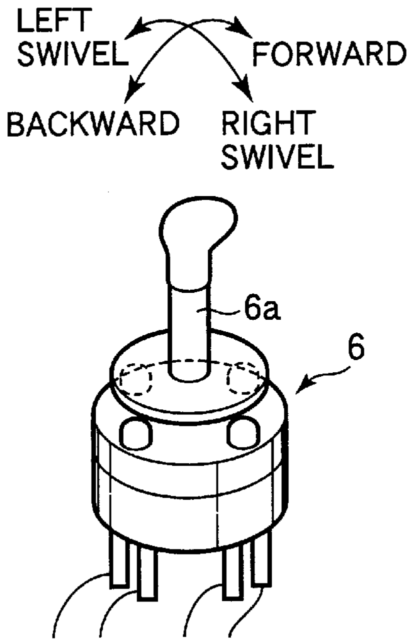
FIG. 6 is a perspective view schematically showing one example of an operating device applied to the related art fluid-pressure transmitting apparatus.
Figure 6B:
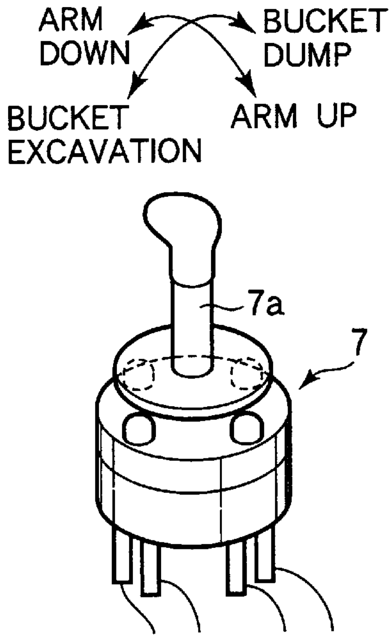

The present invention is different from the related-art fluid-pressure transmitting apparatus 1 shown in FIG. 5 in that, in a traveling pilot hydraulic circuit connected to a capacity control device 5 of a traveling pump 4, a low-pressure selecting valves 17–20 are provided to select a lower one of an output pressure through a traveling operating device 6 outputted through a first pilot-pressure admission passage 13 and an output pressure of a switching valve 10 outputted through a second pilot-pressure admission passage 3*e*. The other circuit configurations and constituent members are substantially not different from the circuit configurations and constituent members of the related-art apparatus. Accordingly, the below explanation will be made centering on the low-pressure selecting valves 17–20. Note that the substantially similar parts to those of the related-art hydraulic circuit are attached with the same reference numerals and member names as the reference numerals attached in FIG. 5 and FIG. 6.

Figure 1:
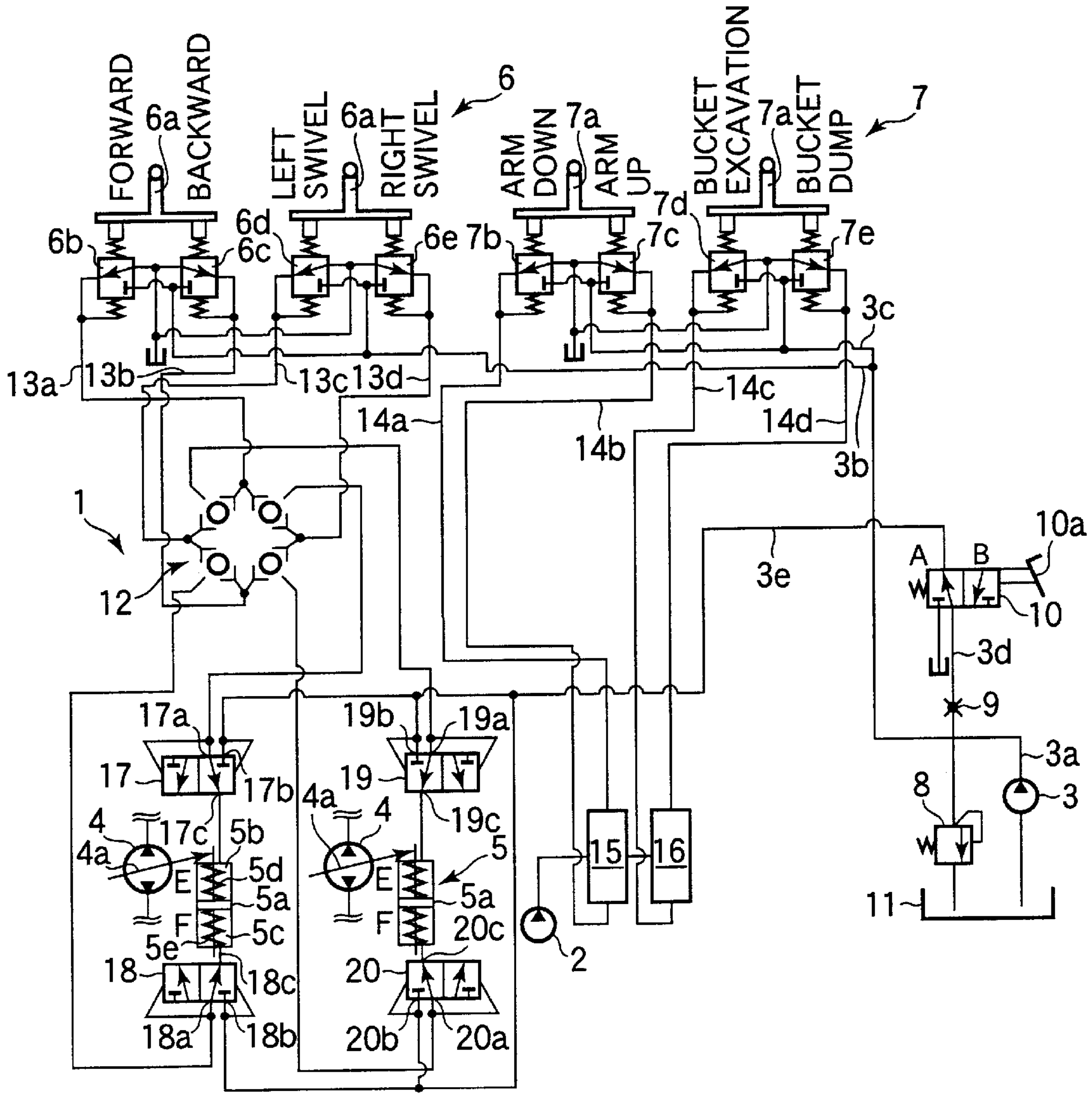
FIG. 1 is a hydraulic circuit diagram of a fluid-pressure transmitting apparatus according to a first embodiment of the present invention.

FIG. 1 typically shows a hydraulic circuit of a fluid-pressure transmitting apparatus according to a representative first embodiment of the present invention. In the figure, a pilot pump 3 is provided as a common hydraulic source to the pilot hydraulic circuits for driving the capacitance control device 5 of the traveling pump 4 and operating valves 15, 16 of work equipment. The traveling pilot hydraulic circuit has a traveling operating device 6 as a first operating unit and a switching valve 10 as a second operating unit. The pilot hydraulic circuit, for driving the operating valves 15, 16 constituting a circuit independent of and different from the traveling pilot hydraulic circuit, at an input side is connected to an oil passage 3*c* branched from a delivery passage 3*a* of the pilot pump 3, and has a working-machine operating device 7 for outputting a delivery pressurized oil of the pilot pump 3 to a working machine pilot-pressure admission passage 14.

The traveling operating device 6 at an input side is connected to a first oil passage 3*b* branched from the delivery passage 3*a* of the pilot pump 3, to output a delivery pressurized oil of the pilot pump 3 to the traveling first pilot-pressure admission passage 13. The switching valve 10 at an input side is connected to a second oil passage 3*d* branched from the delivery passage 3*a,* to output a delivery pressurized oil of the pilot pump 3 as an independent pilot pressure of the output from the traveling operating device 6 to a traveling second pilot-pressure admission passage 3*e*.

In the present embodiment, the switching valve 10 at the input side is connected to the second oil passage 3*d* branched from the delivery passage 3*a* of the single pilot pump 3. However, the invention is not limited to this. For example, in place of the pilot pump 3 a separate pilot hydraulic source can be directly connected to the second oil passage 3*d.*

The first to fourth low-pressure selecting valves 17–20 inserted on the traveling pilot hydraulic circuit each have a three-port, two-position switching valve structure to select a lower input. In the first embodiment, pilot operating valves 6*b*–6*e* of the single traveling operating device 6 are provided correspondingly to the first to fourth low-pressure selecting valves 17–20. The first input ports 17*a*–20*a* of the low-pressure selecting valves 17–20 are respectively connected to the traveling pilot operating valves 6*b*–6*e* through first pilot-pressure admission passages 13*a*–13*d.* The second input ports 17*b*–20*b* of the low-pressure selecting valves 17–20 are connected to the output port of the switching valve 10 through second pilot-pressure admission passage 3*e*.

The pump capacity control device 5 for controlling the delivery capacity of the traveling pump 4 has first and second oil chambers 5*b,* 5*c* partitioned by a piston 5*a*. The oil chambers 5*b,* 5*c* have therein respective springs 5*d,* 5*e*. The output ports 17*c,* 19*c* of the first and third low-pressure selecting valves 17, 19 are respectively connected to first oil chambers 5*b* of the pump capacity control devices 5, 5 of the left-and-right traveling pumps 4, 4. The output ports 18*c,* 20*c* of the second and fourth low-pressure selecting valves 18, 20 are respectively connected to second oil chambers 5*c* of the pump capacity control devices 5, 5 of the left-and-right traveling pumps 4, 4.

The first and second oil chambers 5*b,* 5*c* of the pump capacity control device 5 are selectively inputted by an output pressure outputted depending on a lever operating amount of the traveling operating device 6 and an output pressure from the switching valve 10 outputting depending on a depression amount of the pedal 10*a*. In the state shown in FIG. 1, the output of the pilot operating valve 6*b*–6*e* of the traveling operating device 6 is set lower than a pressure of the delivery oil from the pilot pump 3. The output of the switching valve 10 is set to a higher pressure than a pressure of the output of the pilot operating valve 6*b*–6*e* of the traveling operating device 6. The pump capacity control device 5 is held at a neutral position by springs 5*d,* 5*e*.

When the pilot operating lever 6*a* (operating lever 6*a*) of the traveling operating device 6 is tilt-operated forward, the pilot pressurized oil from the pilot pump 3 is outputted from the output port of the pilot operating valve 6*b* of the corresponding traveling operating device 6 through the first pilot pressure admission passage 13*a* and bridge circuit 12 to the first input ports 17*a,* 19*a* of the first and third low-pressure selecting valves 17, 19 depending on a tilted amount of the operating lever 6*a*. When the operating lever 6*a* is tilt-operated backward, the pilot pressurized oil is outputted from the output port of the pilot operating valve 6*c* through the first pilot pressure admission passage 13*b* and bridge circuit 12 to the first input ports 18*a,* 20*a* of the second and fourth low-pressure selecting valves 18, 20.

When the operating lever 6*a* is tilt-operated toward a left swivel side, the pilot pressurized oil is outputted from the output port of the pilot operating valve 6*d* through the first pilot pressure admission passage 13*c* and bridge circuit 12 to the first input ports 18*a,* 19*a* of the second and third low-pressure selective valves 18, 19. When the operating lever 6*a* is tilt-operated toward a right swivel side, the pilot pressurized oil is outputted from the output port of the pilot operating valve 6*e* through the first pilot pressure admission passage 13*d* and bridge circuit 12 to the first input ports 17*a,* 20*a* of the first and fourth low-pressure selective valves 17, 20.

When depressing operation is made by the pedal 10*a* of the switching valve 10, the pilot oil pressure dependent on the depression is outputted from the pilot pump 3 through the second pilot pressure admission passage 3*e* to the second input ports 17*b*–20*b* of the low-pressure selecting valve 17–20. If the pilot pressurized oil is inputted to the low-pressure selecting valves 17–20, the low-pressure selecting valve 17–20 selects a lower one of the pilot pressure through the first pilot pressure admission passage 13*a*–13*d* and the pilot pressure through the second pilot pressure admission passage 3*e,* thus automatically switching over. The lower pilot pressurized oil automatically selected through the low-pressure selecting valve 17–20 is admitted to the pump capacity control device 5 of the traveling pump 4, thereby controlling the delivery capacity of the traveling pump 4.

In this manner, the lower one of the pilot pressurized oils independently outputted to the first pilot pressure admission passage 13*b*–13*d* and second pilot pressure admission passage 3*e* is automatically selected by the low-pressure selecting valve 17–20 and admitted to the pump capacity control device 5. Even where for example the traveling operating lever 6*a* is tilt-held in a fully operated state, the depression of the pedal 10*a* of the switching valve 10 to a desired depression position makes possible to control the traveling pump 4 toward reducing the pump capacity without depending on the operating amount of the traveling operating lever 6*a*.

Next, explanation will be made on the first to fourth low-pressure selecting valves 17–20 by exemplifying forward travel of a vehicle.

In the state shown in FIG. 1, the pilot pressurized oil outputted through the delivery passage 3*a* of the pilot pump 3 is kept nearly at a constant pressure by the relief valve 8. Herein, for example the pilot pressurized oil assumably has a maximum pressure of about 3 MPa. Also, the output pressure of the pilot operating valve 6*b*–6*e* is set in a range of around the pressure in the tank 11, e.g. lower than the pressure of the delivery pressurized oil of the pilot pump 3, to about 3 MPa.

The oil passages 3*b*–3*d* branched from the delivery passage 3*a* of the pilot pump 3 are acted upon by a delivery pressure of the pilot pump 3 while the second input port 17*b*-20*b* of the low-pressure selecting valve 17–20 is inputted by an output pressure of the selecting valve 10 through the second pilot pressure admission passage 3*e*. On the other hand, because the operating lever 6*a* is not tilted, the first input port 17*a*–20*a* of the low-pressure selecting valve 17–20 has an output pressure of nearly the tank 11 pressure through the first pilot pressure admission passage 13*a*–13*d* to the traveling pilot operating valve 6*b*–6*e*. Accordingly, because the first to fourth low-pressure selecting valve 17–20 is inputted by nearly a tank 11 pressure from the pilot operating valve 6*b*–6*e* and a pilot oil pressure of about 3 MPa from the switching valve 10, the pump capacity control device 5 is held at a neutral position by the spring 5*d,* 5*e*.

Now, for example the traveling operating lever 6*a* is tilt-operated forward into a full state. It is assumed that at this time a pressure of about 3 MPa is outputted from the corresponding pilot operating valve 6*b*. Because the operating lever 6*a* is not tilt-operated toward a side other than the forward, the output pressure of the pilot operating valve 6*c*-6*e* remains the pressure of the tank 11. Also, because the pedal 10*a* is not depressed, a pressure of about 3 MPa is outputted through the operating valve 10.

In this state, the first input port 17*a,* 19*a* of the corresponding first and third low-pressure selecting valve 17, 19 is inputted by a pilot oil pressure of about 3 MPa from the output port of the pilot operating valve 6*b* through the first pilot pressure admission passage 13*a* and bridge circuit 12. The second input port 17*b,* 19*b* of the first and third low-pressure selecting valve 17, 19 is inputted by a pilot oil pressure of about 3 MPa through the switching valve 10.

Accordingly, because the first and third low-pressure selecting valves 17, 19 are inputted by a pilot oil pressure of about 3 MPa from the both of the pilot operating valve 6*b* and the switching valve 10, the output pressure of the first and third low-pressure selecting valve 17, 19 is about 3 MPa. The pilot pressurized oil is supplied to the first oil chamber 5*b* of the capacity control device 5 corresponding to the left-and-right traveling pump 4, 4 through the first input port 17*a*, 19*a* of the first and third low-pressure selecting valve 17, 19 to the output port 17*c,* 19*c* or through the second input port 17*b,* 19*b* to output port 17*c,* 19*c*.

On the other hand, because the pilot operating valve 6*c* of the traveling operating lever 6*a* corresponding to the second and fourth low-pressure selecting valve 18, 20 is not operated, the second low-pressure selecting valve 18, 20 is inputted by both of nearly a tank 11 output pressure of the pilot operating valve 6*c* and an output pressure of about 3 MPa of the switching valve 10. In the second and fourth low-pressure selecting valve 18, 20, the lower one of nearly the tank 11 pressure is selected so that the output pressure does not act to the second oil chamber 5*c,* 5*c* of the left-and-right traveling pump capacity control device 5, 5.

Accordingly, the pressure in the first oil chamber 5*b* becomes greater than the pressure in the second oil chamber 5*c* so that the piston 5*a* moves from E position toward F position shown in FIG. 1. The piston 5*a* balances in a position where the resultant force of the output of the pilot operating valve 6*b* and the spring force of the spring 5*d* equals to the urging force of the spring 5*e*. The swash plate 4*a* of the traveling pump 4 inclines in a capacity-increasing direction so that the delivery capacity of the traveling pump 4 increases and the delivery capacity of the traveling pump 4 becomes the maximum.

When the traveling pump 4 is desired to reduce the pump capacity lower than a pump capacity due to control by an operating amount of the pilot operating valve 6*b* of the traveling operating lever 6*a,* the pedal 10*a* of the switching valve 10 is depressed down. When the pedal 10*a* is depressed, the output pressure of the switching valve 10 decreases in a range of about 3 MPa to tank 11 pressure. The switching valve 10 switches from a supply position A toward a close position B. The delivery pressurized oil of the pilot pump 3 to be supplied to the second input port 17*b*–20*b* of the low-pressure selecting valve 17–20 is reduced in pressure. When the switching valve 10 reaches the close position B, the output pressure of the switching valve 10 becomes nearly the tank 11 pressure.

Herein, it is assumed that, when the pedal 10*a* is depressed in a state that a pilot oil pressure of about 3 MPa is outputted from the pilot operating valve 6*b* of the traveling operating lever 6*a,* a pressure of about 1 MPa is outputted from the switching valve 10. At this time, the first and third low-pressure selecting valves 17, 19 are respectively inputted by the output pressure of about 3 MPa of the pilot operating valve 6*b* and the output pressure of about 1 MPa of the switching valve 10. The output pressure of the pilot operating valve 6*b* is greater than the output pressure of the switching valve 10. In the first and third low-pressure selecting valve 17, 19, the smaller pressure of about 1 MPa of the switching valve 10 is selected. The pilot pressurized oil in the first oil chamber 5*b* of the pump capacity control device 5 in the traveling pump 4 is supplied from the output of the switching valve 10 through the pilot pressure admission passage 3*e.*

On the other hand, the second and fourth low-pressure selecting valves 18, 20 are respectively inputted by nearly the tank 11 output pressure from the pilot operating valve 6*c* of the traveling operating lever 6*a* and the output pressure of about 1 MPa from the switching valve 10. In the second and fourth low-pressure selecting valve 18, 20, the lower one of nearly the tank 11 pressure is selected so that the second oil chamber 5*c* of the traveling pump capacity control device 5 has an output pressure of nearly the tank 11 pressure.

Consequently, the pressure within the first oil chamber 5*b* of the pump capacity control device 5 lowers and the piston 5*a* moves in a direction of from position F to position E shown in FIG. 1. At this time, the spring 5*d* is compressed so that the piston 5*a* balances in a position where the resultant force of the spring force of the spring 5*d* and the output of the pilot operating valve 6*b* equals to the urging force of the spring 5*e.* The swash plate 4*a* of the traveling pump 4 inclines in a capacity-decreasing direction to reduce the delivery capacity of the traveling pump 4. In this manner, vehicle traveling at low speed is realized.

Figure 2:
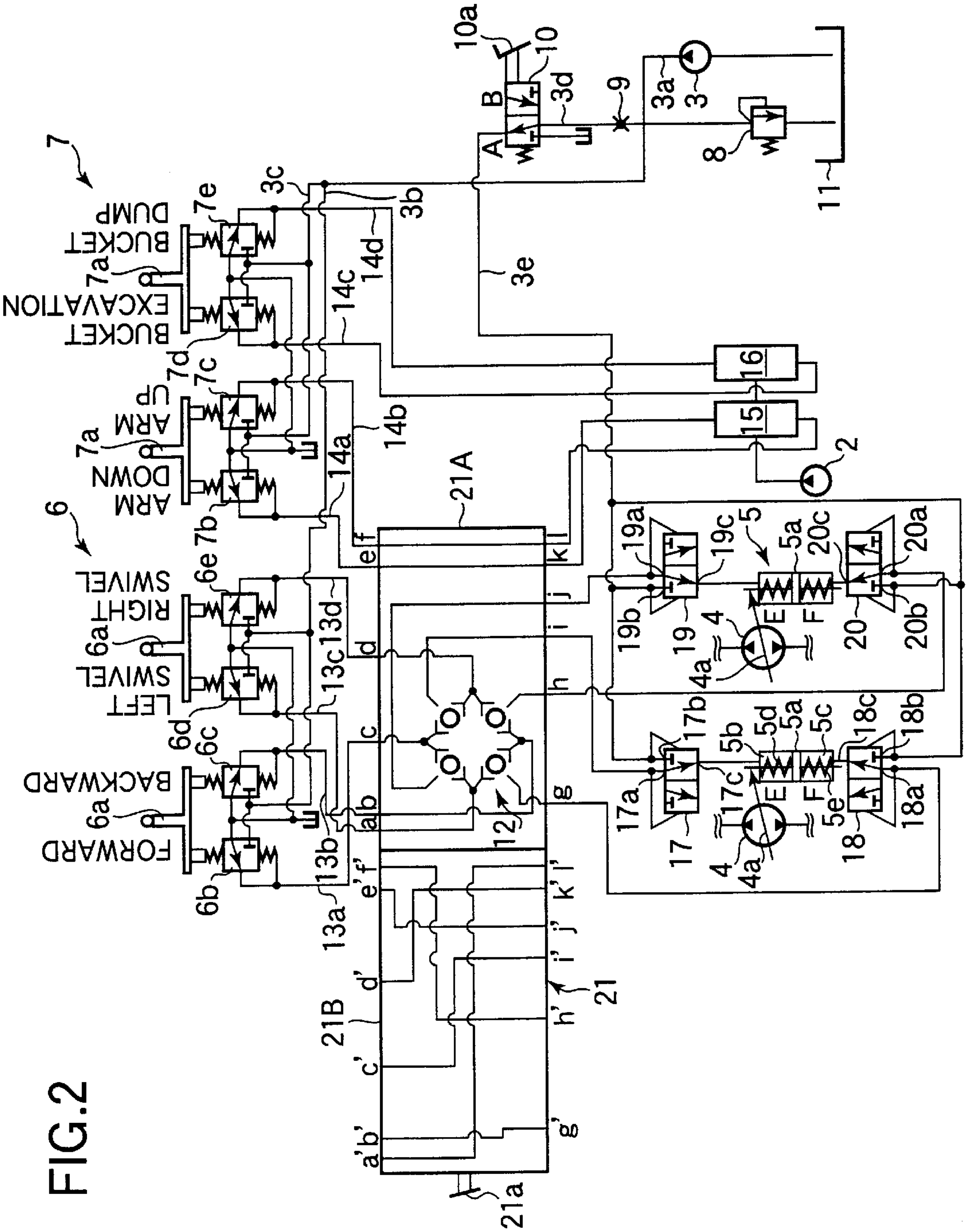
FIG. 2 is a hydraulic circuit diagram of a fluid-pressure transmitting apparatus prior to change of operating pattern according to a second embodiment of the invention.
Figure 3:
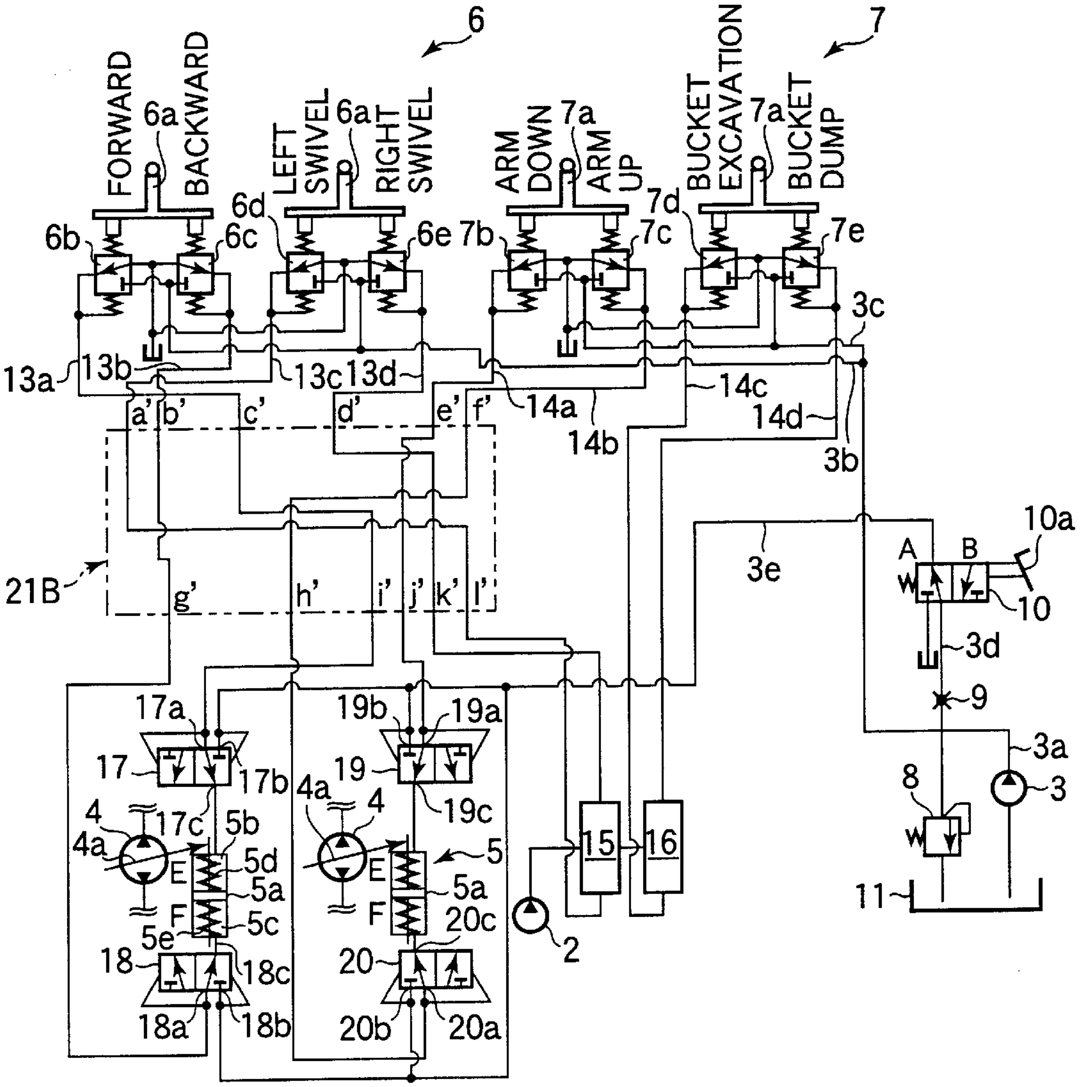
FIG. 3 is a hydraulic circuit diagram of the fluid-pressure transmitting apparatus after change of the operating pattern.

Next, FIG. 2 and FIG. 3 show a second embodiment of the invention.

The difference from the fluid-pressure transmitting apparatus 1 of the first embodiment lies in that an operation-pattern switching valve 21 is provided in the hydraulic circuit of the first embodiment which changes the connections of the pressurized oil passages of the both the traveling and working-machine operating levers 6*a,* 7*a* to change the operation pattern of the traveling and working-machine operating levers 6*a,* 7*a.* The other circuit configurations and structural parts are substantially not different from the circuit configurations and structural parts of the first embodiment. Accordingly, the below explanation will be made centering on the operation-pattern switching valve 21. Note that the members substantially similar to those of the hydraulic circuit of the first embodiment are attached with the same reference numerals and member names as the reference numerals attached in FIG. 1.

FIG. 2 represents one example of a hydraulic circuit of the fluid-pressure transmitting apparatus prior to change in operation pattern due to an operation pattern switching valve 21. FIG. 3 shows one example of a hydraulic circuit after change in operation pattern due to the operation pattern switching valve 21.

In the figures, references a–f respectively show the pilot-pressure admission (input) ports of the traveling first pilot-pressure admission passage 13 and working-machine-actuator driving pilot-pressure admission passage 14, on an output side of the traveling and working-machine operating levers 6*a,* 7*a* prior to change in operation pattern. Also, references g–l respectively represent the pilot-pressure output ports of the first pilot-pressure admission passage 13 and driving pilot-pressure admission passage 14, on an input side of the low-pressure selecting valve 17–20 and arm valve 15 prior to change in operation pattern.

References a'–f' respectively show the pilot-pressure admission ports of the first pilot-pressure admission passage 13 and driving pilot-pressure admission passage 14 after change in operation pattern. References g'–l' respectively represent the pilot-pressure output ports of the first pilot-pressure admission passage 13 and driving pilot-pressure admission passage 14 after change in operation pattern.

As shown in FIG. 2, the operation pattern switching valve 21 having a switch lever 21*a* is structured for change between an operation pattern 21A and an operation pattern 21B. In the operation pattern 21A prior to operation pattern change, the input ports a–d of the first pilot-pressure admission passage 13 respectively communicate with the output ports g–j, similarly to the first embodiment. The input ports e, f of the driving pilot-pressure admission passage 14 respectively communicate with the output ports k, l of the driving pilot-pressure admission passage 14 for the arm valve 15.

Operating the switch lever 21*a* to switch the operation pattern 21A to the operation pattern 21B, as shown in FIG. 3 the input ports a'–d' of the first pilot-pressure admission passage 13 for the operating lever 6*a* and the input ports e', f' of the driving pilot-pressure admission passage 14 for the operating lever 7*a* are respectively connected with the operating levers 6*a,* 7*a*, similarly to the input ports a–f prior to pattern change.

On the other hand, among the pilot-pressure output ports g'–l' of the first pilot-pressure admission passage 13 and driving pilot-pressure admission passage 14, the output ports j', h' of the first pilot-pressure admission passages 13*c,* 13*d* for the third and fourth low-pressure selecting valves 19, 20 respectively communicate with the input ports e', f' of the driving pilot-pressure admission passages 14*a,* 14*b* for the operating lever 7*a.* At the same time, the output ports k', l' of the driving pilot-pressure admission passages 14*a,* 14*b* for the arm valve 15 respectively communicate with the input ports d', a' of the first pilot-pressure admission passages 13*d,* 13*a* for the operating lever 6*a.*

In this manner, by changing the operating pattern 21A to the operating pattern 21B with using the operation pattern switching valve 21, it is satisfactory to merely switch over the output port j', h', k', l' of the pilot-pressure admission passages 13*c,* 13*d,* 14*a,* 14*b* of the working-machine and traveling operating levers 6*a,* 7*a* in the above way.

The traveling operating device 6, when for example the operating lever 6*a* is tilted forward and backward, controls the pump capacity control device 5 of the left traveling pump 4. It, when the operating lever 6*a* tilted leftward and rightward, drives the arm valve 15. Also, the working-machine operating device 7, when for example the operating lever 7*a* is tilted forward and backward, controls the pump capacity control device 5 of the right traveling pump 4. It, when the operating lever 7*a* is tilt-operated leftward and rightward, drives the bucket valve 16.

Accordingly, it is satisfactory to merely switching over the pilot-pressure admission passages 13*c,* 13*d,* 14*a,* 14*b* for the working-machine and traveling operating levers 6*a,* 7*a* in the above way by changing the arrangement of the input-side pipes 3*b,* 3*c* for the working-machine and traveling operating levers 6*a,* 7*a* without the necessity of a two-stage switching valve for simultaneously switching over the connections at the input and output of the operating lever 6*a,* 7*a* and without switching over the second pilot-pressure admission passage 3*e* of the switching valve 10. Therefore, the operating pattern switching valve 21 can be simplified in structure and the pilot-pressure admission passages 13, 14 can be switched by the single operating pattern switching valve 21, thus making possible to easily change the connections of the pressurized oil passages for both the working-machine and traveling operating devices 6, 7.

Figure 4:
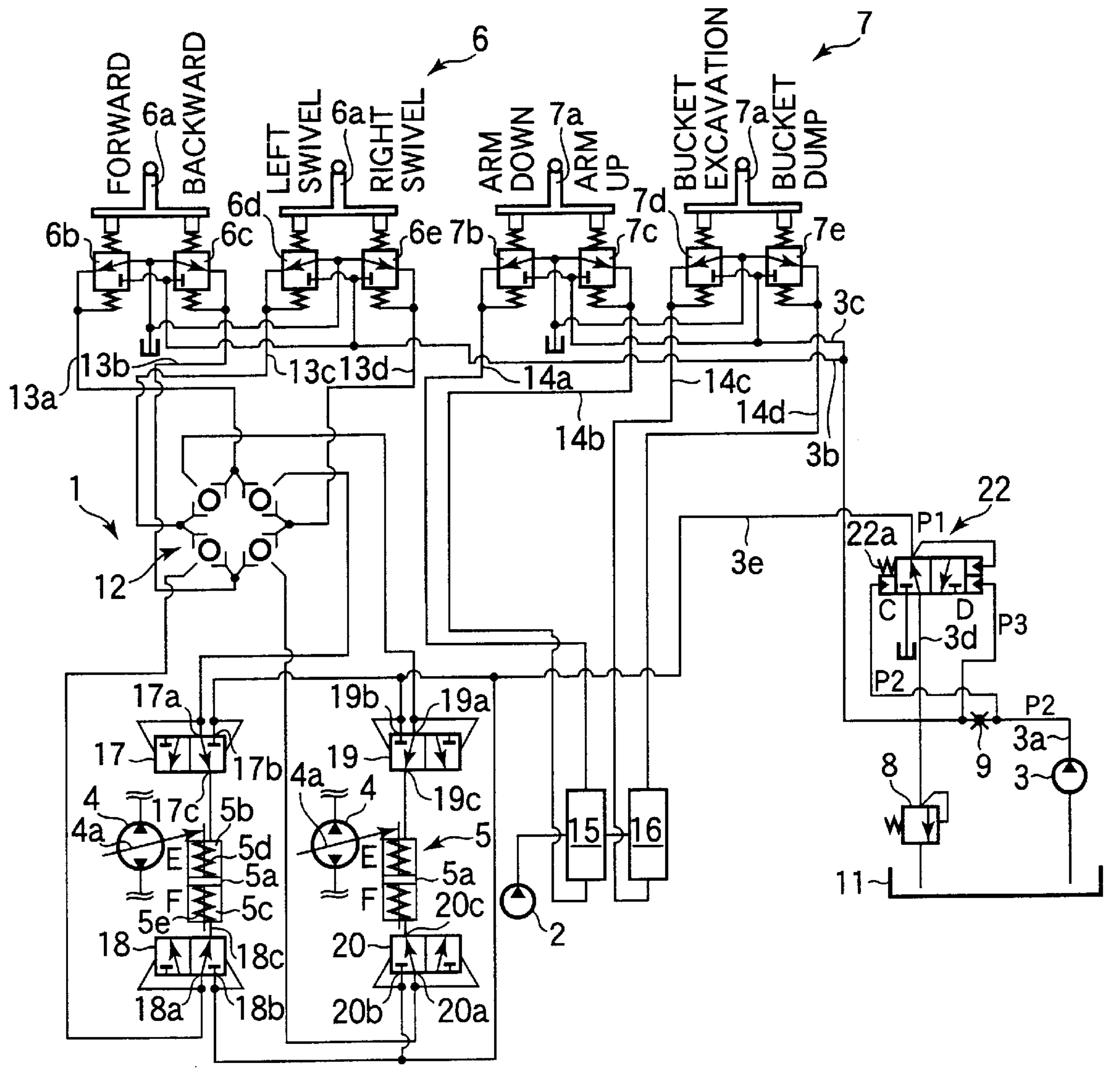
FIG. 4 is a hydraulic circuit diagram of a fluid-pressure transmitting apparatus according to a third embodiment of the invention.

Furthermore, FIG. 4 shows a third embodiment of the invention.

This embodiment is different from the fluid-pressure transmitting apparatus 1 of the first and second embodiment in that it has, in place of the pedal 10*a*-operated switching valve 10, a pressure-reducing valve 22 as a second operating unit to automatically change the output pressure depending upon an engine rotational speed. Note that, in the figure, the substantially same members as those of the above embodiment are attached with the same references and member names. Accordingly, explanation will be omittedly made in detail on these members.

In the figure, the output pressure of the pressure-reducing valve 22 is kept constant by a balance of an output-side pressure P1, a spring force of a spring 22*a,* an upstream pressure P2 of a restriction 9 and a downstream pressure P3. The force balance if changed changes the output pressure of the pressure-reducing valve 22. The upstream pressure P2 of the restriction 9 acts upon a valve position C side shown in FIG. 4 and changes the balance to increase the output pressure of the pressure-reducing valve 22. The downstream pressure P3 of the restriction 9 acts upon a valve position D side opposite to the valve position C and changes the balance to decrease the output pressure of the pressure-reducing valve 22.

As the engine rotational speed decreases, the force acting on the valve position C side decreases thereby decreasing the output pressure of the pressure-reducing valve 22. The output pressure of the pressure-reducing valve 22, automatically increased and decreased by increase and decrease of engine rotational speed, is inputted to the second input ports 17*b*–20*b* of the first to fourth low-pressure selecting valves 17–20 through the pilot-pressure admission passage 3*e* of the pilot pump 3. In the state shown in FIG. 4, the output pressure of the pressure-reducing valve 22 is set at a higher pressure than the output of the pilot operating valve 6*b*–6*e* of the traveling operating device 6. The pump capacity control device 5 is held in a neutral position by the springs 5*d,* 5*e.*

When the operating lever 6*a* of the traveling operating device 6 is operated in a desired direction and pressurized oil is admitted to the first input port 17*a*–20*a* of the low-pressure selecting valve 17–20 through the corresponding first pilot-pressure admission passage 13*a*–13*d,* the corresponding low-pressure selecting valve 17–20 automatically selects a lower pressure through the first pilot-pressure admission passage 13*a*–13*d* depending on an operating amount of the operating lever 6*a* to thereby output the lower pressure to the pump capacity control device 5 for the corresponding traveling pump 4, due to the similar operation to the first embodiment.

When the operating lever 6*a* is fully operated to impose a load on the engine in a state the traveling pump 4 is in a large capacity, engine rotation decreases and the output pressure of the pressure-reducing valve 22 automatically decreases. When the output pressure of the pressure-reducing valve 22 becomes lower than the output pressure of the operating lever 6*a,* the corresponding lower-pressure selecting valve 17–20 similarly to the first embodiment selects the lower pressure through the second pilot-pressure admission passage 3*e* of the pressure-reducing valve 22 and outputs the lower pressure to the pump capacity control device 5 of the corresponding traveling pump 4 through the second input port 17*b*–20*b* of the corresponding low-pressure selecting valve 17–20. The traveling pump 4 is automatically set to a pump capacity commensurate with an engine output.

Due to the provision of the pressure-reducing valve 22, in the traveling pilot hydraulic circuit a lower pilot oil pressure through any one of the first and second pilot-pressure admission passages 13*a*–13*d,* 3*e* is always selected. On the other hand, because the working-machine pilot hydraulic circuit can obtain a desired oil pressure independently of the traveling pilot hydraulic circuit, it can intervene pump capacity control such as engine-stall prevention, without spoiling the operationality of working-machine speed change or the like.

What is claimed is:

1. A fluid-pressure transmitting apparatus having a pilot hydraulic circuit for a pump capacity control device, said fluid-pressure transmitting apparatus comprising:

said pilot hydraulic circuit for driving said pump capacity control device comprising:

a first operating unit connected at an input side to a first oil passage connected to a delivery passage of said pilot pump, to reduce a pressure depending on an operating amount thereof and output it to a first pilot-pressure admission passage of said pump capacity control device;

a second operating unit connected at an input side to a second oil passage connected to a delivery passage of a pilot pump, to reduce a pressure depending on an operating amount thereof and output it to a second pilot-pressure admission passage of said pump capacity control device; and a low-pressure selecting valve connected at an input side to said first and second pilot-pressure admission passages, to select a lower pressure of said first pilot-pressure admission passage and said second pilot-pressure admission passage and output the lower pressure to said pump capacity control device.

2. A fluid-pressure transmitting apparatus according to claim 1, wherein said second operating unit is a switching valve with pedal to gradually reduce an output pressure depending on a depression amount.

3. A fluid-pressure transmitting apparatus according to claim 1, wherein said second operating unit is a pressure-reducing valve to automatically change an output pressure depending on an engine rotational speed.

4. A fluid-pressure transmitting apparatus according to claim 1, wherein an operating unit for another actuator is connected to the delivery passage of said pilot pump and, at an output side thereof, connected to said operating valve of said actuator through a driving pilot-pressure admission passage of said actuator;

an operating pattern switching valve being provided between a pilot-pressure output port of said first unit and a first pilot-pressure input port of said low-pressure selecting valve and between a pilot-pressure output port of said operating unit for actuator and a pilot-pressure input port of said operating valve for actuator; and said operating pattern switching valve communicating between the pilot-pressure output port of said first unit and the pilot-pressure input port of said operating valve for actuator.

5. A fluid-pressure transmitting apparatus according to claim 4, wherein said second operating unit is a switching valve with pedal to gradually reduce an output pressure depending on a depression amount.

6. A fluid-pressure transmitting apparatus according to claim 4, wherein said second operating unit is a pressure-reducing valve to automatically change an output pressure depending on an engine rotational speed.

* * * * *